Inventors:
Leslie Connock Jesty
Norman Rupert Phelp
Attorneys:
Baldwin & Wight

COLOR TELEVISION REGISTRATION SYSTEM

Filed Jan. 8, 1953 3 Sheets-Sheet 2

Inventors: Leslie Connock Jesty
Norman Rupert Phelp
Attorneys: Baldwin & Wright

Inventors:
Leslie Connock Jesty
Norman Rupert Phelp
Attorneys:
Baldwin & Wight

United States Patent Office 2,842,611

Patented July 8, 1958

2,842,611

COLOR TELEVISION REGISTRATION SYSTEM

Leslie Connock Jesty, Burnham-on-Crouch, and Norman Rupert Phelp, Great Baddow, England, assignors to Marconi's Wireless Telegraph Company Limited, London, England, a company of Great Britain Application January 8, 1953, Serial No. 330,302

Claims priority, application Great Britain January 16, 1952

5 Claims. (Cl. 178—5.4)

This invention relates to color television systems and to transmitters and receivers for use therein. Although, for convenience of description, the specification which follows will describe certain transmitters and receivers as co-operating with one another in a system including both, it will be apparent later that these transmitters can be used in conjunction with other receivers and similarly the receivers will reproduce from other transmiters. In other words, the invention is applicable to transmitters and receivers separately.

The problem of securing accurate and correct registration of the pictures in the receiver of a color television system is one that nearly always arises and is most difficult of solution. Thus in most, if not all, color television systems it is required accurately to superimpose two or more images (one in each of the component colors)—in other words to register the pictures—but so far, it has not been found possible to do this to the standards of accuracy required, at any rate by other than most expensive, complex and commercially impracticable apparatus. Similar requirements arise in certain color television systems in which the color fields are imaged side by side on the photocathode of a television camera tube and the images corresponding to these fields are displayed side by side on the screen of a cathode ray reproducer tube. The present invention is applicable to all these and other systems in which the problem of accurate registration arises. The said invention is mainly concerned with three color television systems though it is also applicable to two color systems. It seeks to provide improved color television systems which, while remaining commercially practicable and convenient, will provide accurate picture registration at the transmitter and receiver end.

According to this invention a television transmitter comprises means for scanning picture elements of a picture in different colors in sequence to develop picture signals corresponding to said color and means, actuated by said scanning means, for developing synchronizing signals (hereinafter termed registration signals) at scanning points bearing fixed and predetermined relation to the color sequence, said registration signals being developed at fixed points during line scanning and being interspersed with the color picture signals.

In one way of carrying out the invention, the registration signals are transmitted with the picture signals and used to synchronize scanning action in the transmitter and receiver tubes, the receiver being provided with means for utilizing the registration signals, for controlling the speed of line deflection to ensure accurate correspondence, in the intervals between said signals, of the position of the scanning element at the receiver with that of the element at the transmitter.

In another way of carrying out the invention the registration signals are used at the transmitter, to divert the picture signals into one or other of a plurality of channels, one for each color while at the receiver the intensity of the reproduced picture is modulated by signals selected from the channel again in accordance with color.

Preferably the registration signals are generated at the transmitter by providing a television camera tube there employed with what is in effect a grid of lines running transversely to the scanning line direction, the registration signals being generated as a result of the passage of the cathode ray across the lines of the grid. The grid lines are preferably so arranged that the registration signals replace what would be, in a normal color system, picture signals of a color for which the resolving power of the human eye is low. Thus, in applying the invention to a two color system in which the normal color sequence would be green (G), red (R), G, R, G, R, and so on, the lines of the grid may be so arranged as to make the sequence G, R, G, S, G, R, G, S, G, R, and so on, the letter S here representing registration signals. Again in applying the invention to a three color system with a normal sequence R, G, B, R, G, B and so on (B meaning blue) the sequence would be changed to R, G, B, R, G, S, R, G, B, R, G, S, and so on. In a three color system using one camera for two primary colors R and B and another for G (or W—white) instead of a sequence R, B, R, B, R, B, on said one camera, a sequence of R, B, R, S, R, B, R, S, is used. The methods of carrying out the invention obviously involve the loss of a certain amount of blue information but, owing to the low resolving power of the human eye for blue the quality of the picture is not adversely affected to any important extent.

In a preferred way of applying the invention to a three color television system wherein color signals and registration signals are generated at the transmitter by providing the camera with a grid of strips transverse to the scanning line direction, these strips being R′, G′ and B′ color filters which, in a normal sequence would be R′, G′, B′, R′, G′, B′, R′, G′, B′, and so on, the sequence is altered to R′, G′, B′, R′, G′, S′, R′, G′, B′, R′, G′, S′, and so on, alternate blue strips of the normal grid being replaced by lines adapted to produce separable signals. As already stated owing to the low resolving power of the human eye to blue, such a color sequence produces a picture which is not much different from and requires close examination to distinguish from, one produced with the normal repeated sequence of R, G and B. However it is preferred, in carrying out the invention, to make the brightness of the remaining blue strips in the sequence R′, G′, B′, R′, G′, S′, R′, G′, B′ . . . double normal so as to compensate for the loss of alternate blue strips.

The blue strips may be arranged to have twice the normal light transmission compared with the green and red—the transmission characteristic must still, of course, be the normal "tri-color blue"—by placing neutral filters of density 0.3 over the red and green strips. Alternatively, the blue output could be correctly balanced by suitable modulation of the video amplifier gain for the blue signal.

The invention is illustrated in the accompanying drawings in which.

Figure 1:
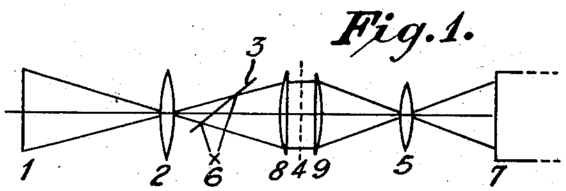
Fig. 1 shows a simple optical system used in carrying out the invention.

Referring to the drawings a scene to be transmitted is imaged onto a grid of lines running at right angles to the scanning line direction the lines being in the sequence R, G, B, R, G, S, R, G, B, R, G, S, and so on the lines S being black (i. e. opaque) and the others being color filter lines of the color indicated by the letters. In Fig. 1 an image of the object 1 is formed by a lens system 2 on the grid 4 which is at one of the principal planes of a lens system comprising lenses 8 and 9. An image of the grid is thus formed at the other principal plane of the system, with unity magnification and this image is thrown by a lens system 5 onto the photo-cathode 7 of an ordinary camera pick up tube of any suitable known form and not otherwise shown in the figure. A semi-silvered mirror 3 passes light from the object 1 to the grid 4 and also reflects light from what may be termed a bias light source 6 onto the grid 4 so that all parts of the said grid 4 receive source illumination, even those corresponding to points (if any) in the image which are not illuminated at all.

Accordingly, there will be thrown on the photo-cathode 7 an image crossed by dark strips (corresponding to strips S of the grid 4). Between these strips the light intensity of the image will vary according to the proportions of primary colors in the separate appropriate areas of the picture.

Figure 2:
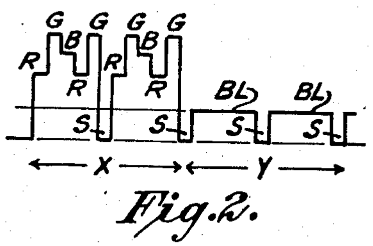
Fig. 2 illustrates a signal train provided by the camera tube arranged as in Fig. 1.

When the camera tube is operated to scan the photocathode in lines at right angles to the direction of the grid lines to produce picture signals a signal train as typified by the conventional representation of Fig. 2 will be obtained. Here the portion X represents the result of scanning a portion of the picture of given color and intensity. The levels marked R, G, and B indicate respectively R, G and B components, i. e. picture signal levels produced when scanning the lines of the picture which have been obtained after passage, respectively, through R, G and B parts of the filter-grid. The level marked S is that produced under conditions of zero illumination, which, in this case, is obtained only where the images of the opaque strips occur.

Referring to Figs. 1 and 2 the portion Y of Fig. 2 corresponds to an unilluminated part of the picture. Here the only light reaching photocathode 7 is due to the bias source 6, the signal level corresponding to this being marked BL. Here again recognizable separable signals S are produced because it is only where the opaque grid strips occur that there is no light on the photocathode 7 and the signal levels fall to level S. It will be apparent that, if the camera tube is of high resolving power and feeds through an amplifier (not shown) of good band width, good sharp rectangular signals S as illustrated in Fig. 2 and of a form easily separable by ordinary amplitude selection means will be obtained. It is, however, by no means necessary to provide registration signal pulses S of as good a form as indicated in Fig. 2 and far less sharp pulses are sufficient to allow of separation from the other signals by amplitude selection so long as their amplitudes are well below the bias level BL.

Figure 3:
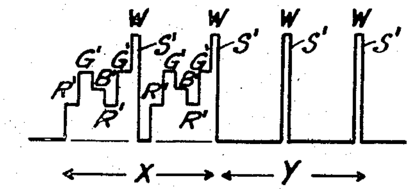
Fig. 3 shows the wave form in which the registration signals are caused by transition from "peak white" to zero illumination.

Reference may now be made to Fig. 3. As will be apparent from Fig. 2, with the apparatus as so far described part of the range of light intensity which the camera tube of Fig. 1 can handle is employed for the registration signals. In some cases this may be deemed a disadvantage. In such cases and/or where it is desired to improve the ratio of the amplitude of the registration pulses to that of random noise (in order to simplify separation of these pulses and render their timing more accurate), the registration signals may be caused to consist of transitions from "peak-white" (the maximum illumination intensity the camera can use) to zero illumination. This result can be achieved either by (*a*) arranging for the bias light source 6 of Fig. 1 to be turned on only just before and during scanning of opaque strips in the grid 4 or (*b*) in the case in which a non-storage type of camera tube is used, by arranging for the bias light to illuminate only very narrow strips each adjacent an opaque strip, the bias light in both cases (*a*) and (*b*) being strong enough to give illumination corresponding to peak-white level.

If this is done the signal output from the camera tube will be as in Fig. 3 instead of as in Fig. 2, the same reference letters R, G, and B being used as in Fig. 2 but designated by prime symbols in Fig. 3 and the letter W denoting peak white. The sharp transitions from peak white to zero illumination—marked S′ in Fig. 3—provides the registration signals and are easily separable from the rest of the signal train by differentiation of that train followed by amplitude selection.

The color component information with regard to the picture being scanned is, of course, contained in the amplitudes of the parts R, G, and B or R′, G′, and B′ of Figs. 2 or 3, as the case may be. There are a number of different ways in which the signals carrying this information may be transmitted. In one way the three different color signals, one for each color, are transmitted over three separate and distinct channels. This may be done by deriving from the registration signals other pulses co-incident with the passing of the scanning point over the R, G and B strips and using these pulses to "sample" the waveform of Fig. 2 to produce signals for the three channels. Apparatus for doing this will be described below. Another way is to transmit over a single channel a composite wave in which the intensities of the three color components are represented by voltage levels occurring at a fixed repetition rate. Such a composite wave is produced as the output signal of the camera tube partially shown in Fig. 1 if it scans the image at an accurately maintained velocity. Very high accuracy is, however, required here—a good deal higher than is attained by the normal deflecting circuits alone—and this very high accuracy is obtained by controlling the scanning velocity by a signal derived by comparing the repetition rate of the registration signals with that of a known source of pulses of strictly constant repetition frequency. Apparatus for doing this will be described later herein.

Owing to the use to which the registration pulses are to be put—this will be described later herein—it is important that they always occur in the same relation to the times of scanning of the R, G and B strips. It may occur that random noise in the camera tube may be high enough to obscure one or more of the registration pulses. To avoid trouble from this cause it is of advantage to provide means for inserting a pulse at the correct time should one be "missed." Such means may comprise a resonant circuit tuned approximately to the registration pulse repetition frequency and energized by said pulses so as to produce a continuous sinusoidal wave with peaks occurring at the frequency of and in synchronism with the registration pulses. Should a pulse be "missed" this resonant circuit will nevertheless continue to oscillate for a few cycles and by taking off the sine wave peaks and shaping them as desired, "replacement" pulses, which will fill in any gap due to a "missed" registration pulse, may be obtained. The resonant circuit used should be well damped so that it will respond to possibly undesirable but sometimes unavoidable small changes in the registration pulse frequency. The sine wave output from the resonant circuit may be used, in any well known way, to produce further pulses of desired shape which are delayed with respect to the originating registration pulses so as to occur at the times of scanning of the R, G, and B strips of the color grid 4 and used to sample the camera tube output to supply signals to three separate color channels. This will now be described with reference to Figs. 4 and 5.

Figure 4:
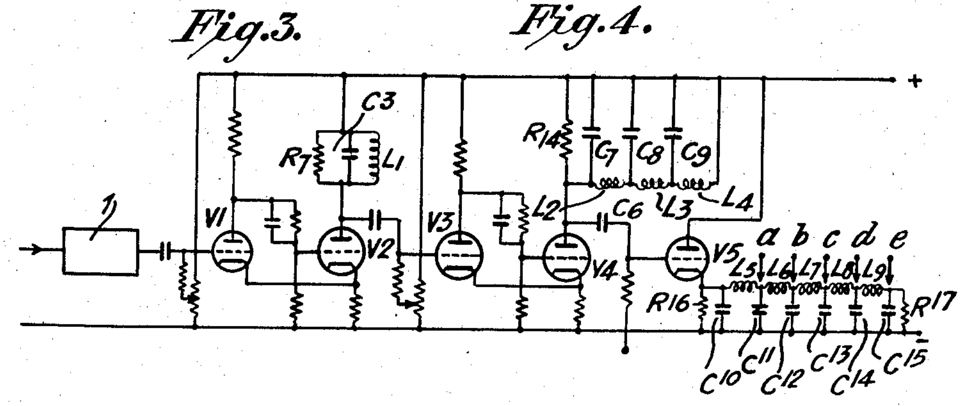
Fig. 4 shows the sampling circuit arrangement suitable for use with the camera arranged as in the instant invention.

Referring first to Fig. 4 the signal output train (assumed to be as in Fig. 2) from the output of the camera tube of Fig. 1 is applied to an inverter 1 as known per se, which inverts the signal train so that the registration pulses S are positive going. The inverted train is applied to the control grid of a valve $V_1$ which, with the valve $V_2$ is connected in the well known Schmitt trigger circuit which produces one output voltage level in response to input voltage levels above a predetermined value and another output voltage level in response to input voltage levels below that value. This Schmitt trigger circuit is adjusted to separate the registration pulses, the said predetermined level being chosen slightly below the level BL. Since the Schmitt circuit is very well known per se, no further description of the connection and operation of the valves $V_1$ and $V_2$ is required here.

The valve $V_2$ has in its anode circuit a tuned circuit $L_1$ $C_3$ damped by a shunt resistance $R_7$ and tuned to the registration pulse repetition frequency. It will accordingly produce an approximately sinusoidal wave with peaks at the registration pulse repetition frequency and coincident with those pulses, these peaks occurring even if one or two registration pulses are accidentally missed in the train of Fig. 2, applied at the input of Fig. 4.

Voltage set up across the resonant circuit $C_3L_1R_7$ is applied to the first valve $V_3$ of a second Schmitt trigger circuit including valves $V_3$ and $V_4$ and which is adjusted so that the valve $V_3$ conducts only on the positive peaks of the sinusoidal wave input. A rectangular pulse is produced, at each such peak, across the resistance $R_{14}$ in the anode circuit of the valve $V_4$ and across which is a delay line comprising the elements $L_2L_3L_4C_7C_8C_9$ having a characteristic impedance equal to the value of resistance $R_{14}$ and shorted at its other end. Thus, at each sinusoidal wave peak in the input to valve $V_3$ there will be a change in the anode current of valve $V_4$ and this will constitute the beginning of a substantially rectangular pulse the length of which is determined by the constants of the delay line $L_2L_3L_4C_7C_8C_9$.

This pulse is applied via condenser $C_6$ to the grid of a valve $V_5$, having a cathode circuit output which is fed to a second delay line comprising elements $L_5L_6L_7L_8L_9$ $C_{10}C_{11}C_{12}C_{13}C_{14}C_{15}$ correctly terminated at both ends by resistances $R_{16}R_{17}$ equal to its characteristic resistance. Sequentially delayed outputs are taken from tapping leads *a, b, c, d, e,* on the second delay line and the taps being so chosen that these outputs consist of pulses respectively coincident with the scanning of the RGBRG strips of the color grid 4 (Fig. 1). These pulses are of length equal to the pulse length produced at the anode of valve $V_4$, the line $L_2L_3L_4C_7C_8C_9$ being designed so that the said pulse length is a little less than the time required to scan one strip of the grid.

Figure 5:
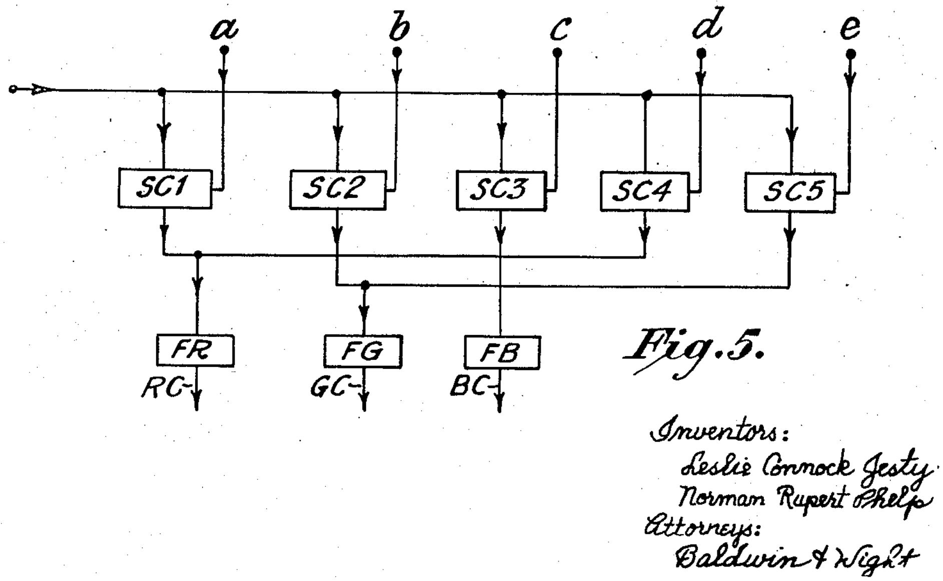
Fig. 5 shows the sampling circuit whereby the outputs at *a, b, c, d* and *e* in Fig. 4 are used to sample the wave train outputs from the camera tube.

Fig. 5 shows, in block diagram, a sampling circuit arrangement whereby the outputs at *a, b, c, d* and *e* of Fig. 4 are used to sample the wave train output from the camera tube to provide separate color signals for three separate channels.

Referring to Fig. 5 the signal train (Fig. 2) from the camera tube of Fig. 1 is fed to five sampler circuits SC1 to SC5 of any well known type and such as to pass on the input signal to the output only when a sampling pulse is fed thereto. These sampling pulses are those derived from the taps *a, b, c, d, e* on the second delay line of Fig. 4, the said pulses being fed in to the sampler circuits over the leads also marked *a, b, c, d, e* in Fig. 5.

The outputs from the samplers SC1 and SC4 are joined and fed through a filter FR to the red signal channel indicated at RC. Similarly the outputs from samplers SC2 and SC5 are fed through filter FG to a green signal channel GC and the output from sampler SC3 is fed through filter FB to a blue signal channel BC. The filters FR and FG are low pass filters having a cut off frequency below the repetition rate of the pulses which will constitute the outputs of the samplers from which they are fed. The filter FB is also a low pass filter but has a cut off frequency of one half that of the filters FR and FG since only half as many blue strips as red or green strips are scanned in a given time. Thus the signals fed out to the three channels will be continuous voltage wave forms correctly representative of their respective color intensities in the picture being scanned.

The grid 4 (Fig. 1) may be produced in any convenient way e. g. photographically by exposing a color photographic plate or film to a slit or slits illuminated with light the color of which conforms to the required color sequence, the plate or film being moved the required distance with respect to the slit or slits between successive exposures to light of different colors.

Alternatively, instead of a separate grid 4 as shown in Fig. 1, the required color grid may be incorporated in the camera tube itself, constituting the surface on which is deposited the photo-sensitive cathode or mosaic (7 of Fig. 1) of said tube. In this case the color filter may comprise strips of color filtering material e. g. colored glass or known interference type color filter strips or a lenticular grid co-operating with external strip color filters in manner known per se.

Figure 6:
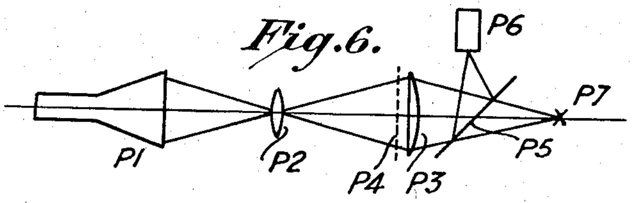
Fig. 6 illustrates a part of a receiver arranged to cooperate with the transmitting apparatus as shown in Figs. 1, 4 and 5.

Fig. 6 represents part of a receiver adapted to co-operate with (though not limited to its use with) a transmitter incorporating apparatus as represented in Figs. 1, 4 and 5. Here a picture cathode ray tube P1 of the usual type forms a raster on its screen and an image of this raster is thrown by a lens system P2 on to a color grid P4, the counterpart of the grid 4 of Fig. 1, with strips running at right angles to the scanning line direction. A further lens system P3 converges the emergent light, colored by passage through grid P4, on to the eye of an observer placed at P7 or on to a further lens system (not shown) adapted to produce an image on a viewing screen. A semi-silvered mirror P5 diverts part of the light from lens P3 to a photoelectric cell P6 which will give an output proportional to the intensity of the light reaching it, the said output becoming a minimum when the flying spot produced by tube P1 and imaged on the grid P4 scans the opaque strips therein. Since the fluorescent screen of the tube P1 possesses afterglow there will still be, when the spot is scanning an opaque strip, some light emitted by parts of the screen just scanned and such light, reaching the cell P6 may prevent the output from said cell reaching the same minimum level each time an opaque strip is scanned. This effect is well known in flying spot television technique and, if troublesome, may be corrected for by any of the means known in such technique.

The pulses of minimum output from cell P6 thus constitute recovered registration pulses, one occurring each time an opaque strip is scanned. In order that these recovered pulses may always be obtained at the correct times, even when the portion of the picture being scanned is dark, the tube P1 may have a suitable bias applied to its modulating electrode (not shown) so that it emits light of low intensity even during dark parts of the picture, or, better, a brightening pulse may be applied to said modulating electrode just prior to scanning each opaque strip, the brightening pulses causing the tube P1 to emit sufficient light to cause the immediately succeeding passage of an opaque strip to produce a recognizable separable output change from the cell P6. Such brightening pulses may be derived from the registration pulses in any manner known per se. It will be at once appreciated that the two expedients, just described, of biasing the tube P1 serve a purpose which is the counterpart of that served by the bias expedients described in connection with the bias source 6 of Fig. 1.

Figure 7:
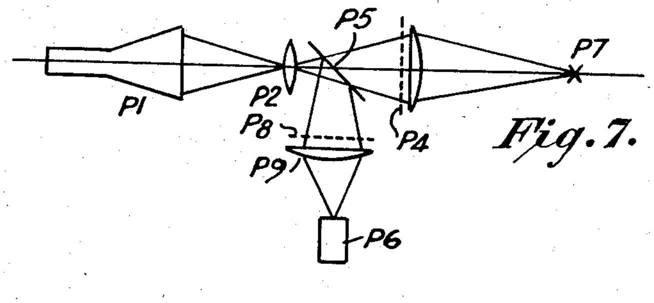
Fig. 7 shows an alternative arrangement to that shown in Fig. 6.

A somewhat preferred alternative to Fig. 6 is shown in Fig. 7. In these two figures like references denote like parts.

Here the semi-silvered mirror P5 precedes the grid P4 in the main light path and there is interposed between said mirror and the cell P6 a synchronizing grid P8 having narrow transparent strips of the same pitch (spacing) as the opaque strips in grid P4, the rest of grid P8 being opaque. The arrangement is such that light crosses an opaque strip in grid P4 and a transparent strip in grid P8, simultaneously. Alternatively it may be preferred so to arrange matters that light starts to cross an opaque strip in grid P4 just prior to the commencement of passage of a transparent strip in grid P8. If this is done it is possible to arrange that the brightening pulse above mentioned occurs in coincidence with the scanning of an opaque strip so that it will not be visible to an observer, the flying spot attaining a predetermined brightness on commencing to traverse a transparent strip in grid P8. Light passed by grid P8 is projected by lens system P9 on to cell P6 whose output pulses, now occurring at maximum illumination of the cell, constitute the registration signals.

Figure 8:
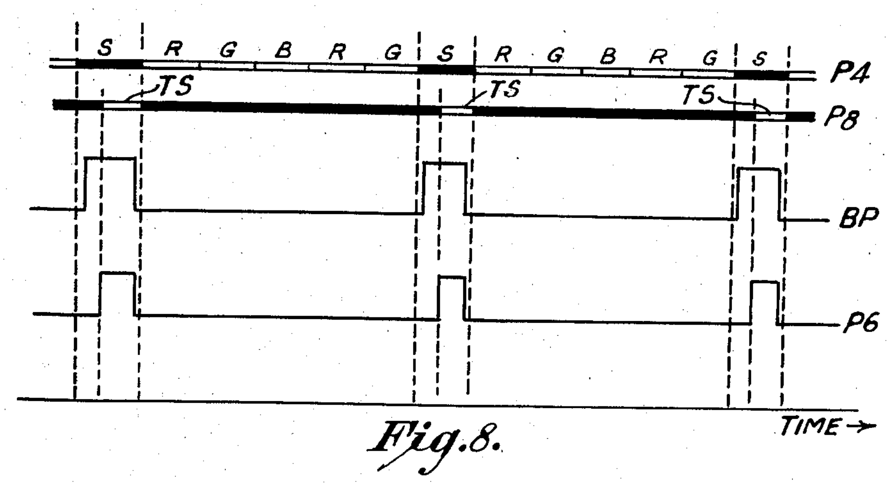
Fig. 8 is a chart showing the time relations of the color and synchronizing grids, the brightening pulses and the output pulses.

The time relations of the scanning of the color and synchronizing grids, the brightening pulses, and the output pulses from cell P6 (Fig. 7) are all shown conventionally in Fig. 8. Here line BP represents the brightening pulses which occur during scanning of an opaque strip (indicated by letter S in the top line of the figure) in grid P4 but is shorter than the scanning time of that strip. The other letters R, G, B in said top line represent red, green and blue filter strips of the said grid P4 which, as a whole, is indicated by the reference P4. P8 represents the synchronizing grid with its transparent strips TS. It will be noted that these commence a little after the commencement of the opaque strips S in grid P4. The line P6 represents the pulsed output from the cell P6.

Synchronizing pulses from the cell P6 of Fig. 8 are applied as input to a circuit which is not separately shown because it is exactly as illustrated in Fig. 4 except that the inverter 1 is omitted and the first amplitude selector including valves $V_1$ $V_2$ may also be omitted though it is preferred to retain this to provide more certain separation of the registration signals from cell noise. This circuit produces from its tappings *a, b, c, d, e* (see Fig. 5) pulses coincident with the scanning of the R, G, B, R and G strips in the grid P4.

Figure 9:
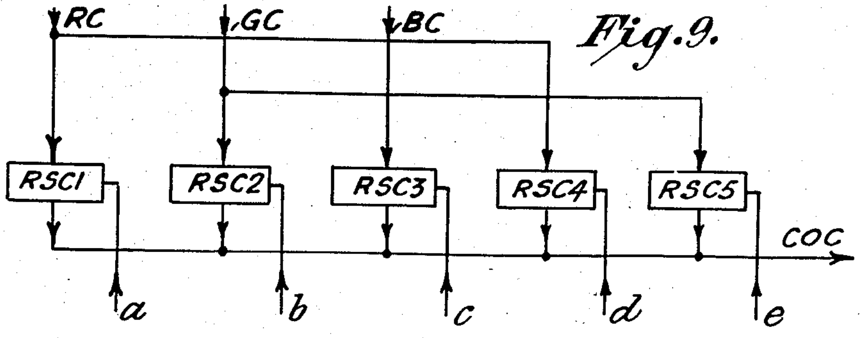
Fig. 9 is a diagrammatic view showing the various pulses applied to five amplifiers RSC1 to RSC5.

These pulses are applied at *a, b, c, d, e* to five samplers RSC1, RSC2, RSC3, RSC4 and RSC5 shown in Fig. 9 to render them, when subjected to a pulse, operative to pass input signals to their outputs. The inputs applied to samplers RSC1 and RSC4 are the red signals from the red channel RC; the inputs to samplers RSC2 and RSC5 are the green signals from the green channel GC; and the input to the sampler RSC3 is the blue signal output from the blue channel BC. The same channel references RC, GC and BC are used in Figs. 5 and 9, the former showing the input ends and the latter the output ends of the same channels. The outputs from the five samplers are combined in the common output circuit COC which feeds the modulating electrode (not shown) of the picture reproducer tube P1 of Fig. 7 so that the intensity of the light produced by that tube is in proper accord with and occurs at the proper times of, the color information signals. The brightening pulses, above referred to and used to ensure that the flying spot has a definite sufficient intensity when scanning opaque strips in the grid P4 may be derived from a tap additional to the taps *a, b, c, d, e* on the delay line having these tappings and so chosen that the delay time to the additional tap is equal to the time required to scan one cycle of the sequence R, G, B, R, G, S so that one synchronizing pulse will give rise to a brightening pulse occurring just prior to the next synchronizing pulse as shown in Fig. 8.

Figure 10:
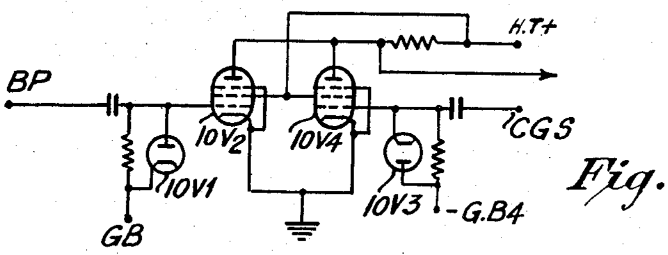
Fig. 10 is a circuit diagram showing the manner in which the flying spot produced by the picture tube is maintained bright enough to produce the first registration pulse.

It is necessary that, at the start of each scanning line the flying spot produced by the picture tube P1 (Fig. 6 or 7) shall be bright enough to produce a first registration pulse from which the succeeding brightening pulse may be derived. Fig. 10 shows a preferred circuit suitable for ensuring this.

Figure 11:
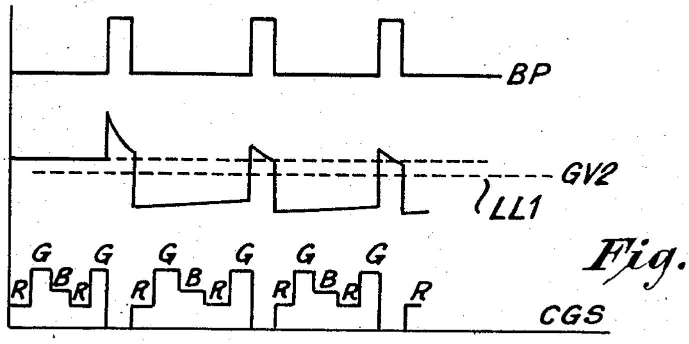
Fig. 11 is a graph showing characteristics of the operation of the circuit of Fig. 10.

Referring to Fig. 10 and to the related graphical figure, Fig. 11, the brightening pulse, shown at line BP of Fig. 11, is applied at point BP in Fig. 10 through a resistance capacity coupling network to the grid of a valve $10V_2$. A diode $10V_1$ connected across the resistance of the coupling network, is arranged to conduct when a brightening pulse is applied so that, when such a pulse is applied the voltage at the grid of valve $10V_2$ falls as shown by line $GV_2$ of Fig. 11 to a value determined by a bias voltage which is applied at GB in Fig. 10. During intervals between pulses the diode $10V_1$ is non-conductive and the condenser in the input coupling network discharges through the resistance across which the diode is connected but the design is such that this discharge is slow so that, for practical purposes, the voltage at the grid of valve $10V_2$ remains between pulses virtually that of the bias source connected at GB. Succeeding brightening pulses cause the diode to conduct and the condenser to re-charge sufficiently to balance the loss of the charge between pulses so that the result is that the peaks of the brightening pulses always tend to occur at a level determined by the voltage applied at GB. At the end of a scanning line the brightening pulses are interrupted and the condenser, discharging slowly through the resistance, causes the grid of the valve to retain a voltage substantially equal to the bias voltage at GB by the time the next line starts.

The anode of valve $10V_2$ is connected to the cathode of the picture tube P1 (not shown in Fig. 10), said anode being connected to HT+ through the usual anode resistance. The arrangement is such that the potential thus applied at the cathode of the picture tube P1 is such as to cause it to emit light of sufficient intensity to produce a distinguishable output from the photo-cell P6 (Fig. 6 or 7) and such that, at times when the voltage at the grid of valve $10V_2$ reaches or exceeds the level $LL_1$ of Fig. 11 the tube P1 emits light.

At point CGS of Fig. 10 is applied a combined color signal waveform as shown at CGS of Fig. 1 and obtained from lead COC of Fig. 9. This wave form represents the picture information (the same letters are used in Fig. 11 as in Fig. 2). This wave form is applied to the control grid of a valve $10V_4$ through a resistance-capacity-diode network including diode $10V_3$ and generally similar to that including diode $10V_1$. Both valves $10V_2$ and $10V_4$ have a common anode load resistance and both valve anodes are connected to the cathode of the picture tube P1 (not shown in Fig. 10). Diode $10V_3$ conducts during intervals between the pulses of wave form CGS so that, during these intervals the potential at the grid of valve $10V_4$ is equal to the bias potential applied at GB4. This bias potential is such as to cut-off the picture tube. Between intervals, when picture signals are present, the picture is reproduced by the picture tube P1 in the usual way.

As will now be seen the picture on the screen of the picture tube P1 will have bars transverse to the scanning lines, these bars, when imaged on the color grid, registering with the opaque strips thereof.

Figure 12:
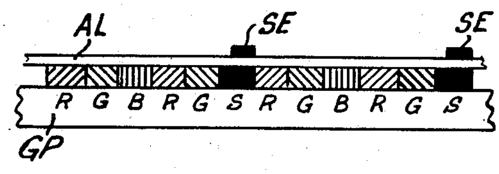
Fig. 12 is a diagrammatic sectional view showing a color grid incorporated in the screen structure of a picture tube in accordance with our invention.

Instead of using an external, separate grid P4 as in Figs. 6 and 7 a color grid may be incorporated in the screen structure of the picture tube P1. Such a color grid, which is not per se part of this invention, is represented in Fig. 12. It consists of a glass plate GP, for carrying the screen material of the cathode ray tube, and on which are deposited strips of phosphors R, G, B fluorescing in red, green and blue respectively when electronically bombarded, and strips S of non-fluorescent material (alternatively the strips S may be simply left blank). On the side of the strips remote from the glass plate GP is deposited a thin layer AL of aluminium which, in use, acts as a final anode for the tube and is maintained at appropriate potential through a lead (not shown). On top of the layer AL are deposited strips SE of material of secondary emitting coefficient different from that of aluminium and postioned over the strips S being preferably, as shown, somewhat narrower than the said strips S. A suitable electrode (not shown) is provided to collect secondary electrons from the strips SE.

When this screen is scanned by a picture signal modulated ray controlled as already described it produces a colored picture, while registration pulses, corresponding to those produced by the cell P6 of Fig. 6 or 7, utilizable in the same way, are produced from the secondary electron collecting electrode (not shown). Instead of secondary emitting strips SE for producing the pulses, simple conductive strips insulated from the layer AL may be used, the pulses being obtained in a circuit including said strips and the scanning ray.

The invention may also be carried into effect by apparatus constructed almost entirely as already described but operated in a different manner. The method of operation already described may, for convenience, be termed "unlocked" operation and the method now to be described may be termed "locked" operation.

In the locked method of operation the signal from the camera tube whose photo-cathode is shown at 7 in Fig. 1 is retained in the form shown in Fig. 2 except that the registration pulses S may be caused to be of a different level from that (corresponding to no illumination) originally produced e. g. white or grey. This signal however still contains the information (as represented at line CGS of Fig. 11) necessary for rebuilding a colored picture at the receiver.

In order to ensure precise synchronization of scanning in the camera tube at the transmitter and the picture tube P1 at the receiver a source of oscillations of constant frequency is provided and the repetition frequency of the registration pulses produced both at the transmitter and the receiver are compared with these oscillations, any departure from the frequency of the source being utilized to correct the line scanning velocity at transmitter or receiver, as the case may be.

Figure 13:
Fig. 13 is a block diagram showing the method of securing synchronization of the camera tube scanning at the transmitter and the picture tube at the receiver.

This method of operation is illustrated in the highly simplified block diagram of Fig. 13. The registration pulses produced during scanning at the transmitter or at the receiver (as the case may be) by scanning of opaque bars in a color grid, are applied at terminal RI as one input to a phase discriminator PD of known type whose second input is supplied from a local oscillator LO which is synchronized as described later herein. The phase discriminator is adapted to produce an output dependent upon the phase relation between the two inputs, which are intended to be of the same frequency and phase. This output is passed through a filter PF to an amplifier PA whose amplified output is fed at OUT to a pair of coils mounted on the neck of the camera or picture tube (as the case may be) or to a pair of plates inside the tube in question and serving to deflect the beam in the line direction. The coils or plates (not shown in Fig. 13) may be the normally provided line deflection means of the tube or they may be supplementary to said means.

With this arrangement any departure from the in-phase relationship between the two inputs to the discriminator PD produces an alteration in the line scanning deflection velocity to correct for said departure. The filter PF is to prevent over-correction and consequent "hunting" and is designed in accordance with well known principles.

Figure 14:
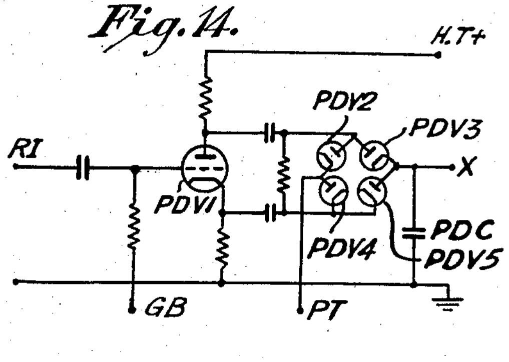
Fig. 14 is a diagrammatic circuit arrangement of the discriminator indicated at PD in Fig. 13.
Figure 15:
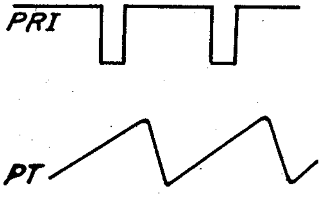
Fig. 15 illustrates the wave forms which are applied to the circuit arrangement shown in Fig. 14.

Fig. 14 shows a suitable form for the discriminator PD of Fig. 13. It comprises a valve $PDV_1$ to whose control grid the input pulses are applied from RI via a resistance-capacity coupling network, grid bias being applied at GB. The anode and cathode resistances of the valve $PDV_1$ are made equal so that equal but oppositely sensed pulses appear at the anode and cathode of said valve simultaneously. These pulses are applied to a circuit comprising four diodes $PDV_2$, $PDV_3$, $PDV_4$ and $PDV_5$ connected as shown so that application of a pulse causes them to conduct and pass current to charge a condenser PDC to a potential applied at PT. In the absence of pulses the diodes are not conductive and the potential at point X remains at the same value. If then a saw tooth wave form of the form shown at PT of Fig. 15 is applied at PT of Fig. 13, the voltage at point X of the said Fig. 14 will be equal to the voltage at point PT at the time of application of the pulse to point RI. The pulse wave form at RI is represented at PRI in Fig. 15. So long as the frequency and phase of the two wave forms (PRI and PT) remain constant in relation to one another the voltage at X will remain constant. If, however, the phase relation changes the voltage at X changes, the change of voltage being representative of the change of phase.

The voltage wave PT of Fig. 15 is, of course, produced by the oscillator LO of Fig. 13. This is synchronized to a master synchronizing signal generator (not shown) of the whole system either by means of a regularly repeated pulse transmitted co-incident with the scanning of opaque strips in the color grid or by the transmission of a "burst" signal, i. e. a signal of the frequency of the registration signals, transmitted at short intervals only during the blanking period at the begining of each line.

If desired, the brightening pulses hereinbefore mentioned may be derived from the above mentioned synchronized oscillator.

The comparative simplicity (having regard to the results achieved) of systems in accordance with this invention will be observed, systems as particularly described involving the use on only one camera and requiring no mechanically driven colour discs. Furthermore they are readily adaptable to existing monochrome television systems. In certain forms of the invention it will be seen that if there were no change in the transmission scanning standards—i. e. if the number of lines and fields per second, the form of interlacing, the video bandwidth and the transmitter frequency were required to be unchanged—the price of the addition of color to the picture would be the loss of about one half to one third of the horizontal resolution (assuming horizontal scanning lines) as compared to monochrome transmission for the width of one color strip would correspond to one picture point in the monochrome system. However, in converting to color, the number of lines and fields per second and the form of interlace might be left unchanged but an increase of video bandwidth—probably requiring a high carrier frequency radio transmitter—tolerated in order to achieve the same original (monochrome) horizontal resolution. Such a bandwidth increase would be of about two to three times. The signals corresponding to this increased bandwidth could, if desired, be passed through a low pass filter of the original (monochrome) bandwidth and fed to a transmitter similar to that originally used for monochrome transmission. Such signals, if received upon a normal monochrome receiver would produce pictures indistinguishable from the normal monochrome pictures. Thus a color camera could be used to maintain a color service and a monochrome service simultaneously. Alternatively existing monochrome receivers could be fitted with a simple adaptor to enable them to receive the new carrier on which the color transmission was effected and, since the receivers would act automatically as low pass filters, would be able to produce from the color transmission satisfactory monochrome pictures. This ability to provide color transmission in such a way that existing monochrome receivers are still able to produce monochrome pictures therefrom is an obviously important practical advantage.

We claim:

1. A color television transmitter comprising means for scanning a picture in lines, means for developing, during scanning, successive color picture signals representative of different color intensities of different successive points in the picture, means including a color grid composed of successive strips of different colors and neutral strips, said strips running at right angles to the scanning line direction for developing, during each scanning line, registration signals different and separable from the picture signals, said registration signals being developed at fixed points during line scanning and being interspersed with said color picture signals, the color sequence including a color of low visibility brightness compared with the other colors in the sequence, a strip for producing a registration signal being substituted for each alternate strip of said low visibility brightness color.

2. A color television transmitter according to claim 1 wherein the brightness of the remaining alternate strips of low visibility brightness color is increased so as to substantially compensate for the loss of the alternate strips which have been substituted by the registration signal producing strip.

3. A color television transmitter according to claim 1 wherein the color sequence includes blue and a registration signal is substituted for each alternate blue color signal.

4. A color television transmitter according to claim 1 wherein the color sequence includes red and a registration signal is substituted for each alternate red color signal.

5. A color television transmitter according to claim 1 wherein the neutral strips in the color grid are opaque.

References Cited in the file of this patent

UNITED STATES PATENTS

| | | |
|---|---|---|
| 2,535,552 | Schroeder | Dec. 26, 1950 |
| 2,566,713 | Zworykin | Sept. 4, 1951 |
| 2,630,485 | Heikes | Mar. 3, 1953 |
| 2,634,328 | Goodale et al. | Apr. 7, 1953 |
| 2,641,642 | Behrend | June 9, 1953 |
| 2,641,643 | Wentworth | June 9, 1953 |
| 2,649,499 | Barco et al. | Aug. 18, 1953 |
| 2,710,309 | Antranikian | June 7, 1955 |